(12) United States Patent
Ohtsuka (10) Patent No.: US 9,370,936 B2
(45) Date of Patent: Jun. 21, 2016

(54) PRINTING METHOD USING WHITE PARTICLES

(71) Applicant: FUJIFILM Corporation, Minato-ku, Tokyo (JP)

(72) Inventor: Shuichi Ohtsuka, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/694,591

(22) Filed: Apr. 23, 2015

(65) Prior Publication Data

US 2015/0224787 A1    Aug. 13, 2015

Related U.S. Application Data

(63) Continuation of application No. PCT/JP2013/075018, filed on Sep. 17, 2013.

(30) Foreign Application Priority Data

Oct. 25, 2012   (JP) ................................ 2012-235318

(51) Int. Cl.
*B41J 2/015*   (2006.01)
*B41J 2/21*    (2006.01)
(Continued)

(52) U.S. Cl.
CPC .... *B41J 2/21* (2013.01); *B41J 2/01* (2013.01); *B41J 2/2114* (2013.01); *B41J 2/2117* (2013.01);
(Continued)

(58) Field of Classification Search
CPC ............ B41J 2/21; B41J 2/2107; B41J 2/211; B41J 2/2114; B41J 11/015
See application file for complete search history.

(56) References Cited

U.S. PATENT DOCUMENTS

2005/0270351 A1   12/2005   Mouri et al.
2009/0296173 A1*  12/2009   Mestha .................. G03G 15/01
                                                                       358/518
2010/0214352 A1    8/2010   Tsunoda et al.

FOREIGN PATENT DOCUMENTS

EP   1288012 A2    3/2003
JP   2000313830 A  11/2000
(Continued)

OTHER PUBLICATIONS

International Preliminary Report on Patentability and Written Opinion, mailed May 7, 2015, issued in corresponding International Application No. PCT/JP2013/075018, 5 pages in English.
(Continued)

*Primary Examiner* — Stephen Meier
*Assistant Examiner* — Patrick King
(74) *Attorney, Agent, or Firm* — Sughrue Mion, PLLC (57) ABSTRACT

A printing method includes a step of supplying a first aggregating agent that induces an aggregation reaction of the white particles contained in the white particle ink, to the colored printing medium; a step of supplying, by the inkjet method, the white particle ink onto the colored printing medium having been supplied with the first aggregating agent such that aggregation of the white particles brings about increase in optical reflectance in a printing area; a step of supplying a second aggregating agent that is charged with same charge as that for the first aggregating agent and that induces an aggregation reaction of dye contained in dye ink, to the white particles aggregated; and a step of supplying, by the inkjet method, the dye ink to the white particles aggregated.

8 Claims, 5 Drawing Sheets

(51) Int. Cl.
*B41J 2/01* (2006.01)
*B41M 5/00* (2006.01)
*C09D 11/00* (2014.01)
*C09D 11/322* (2014.01)
*C09D 11/328* (2014.01)
*C09D 11/40* (2014.01)
*B41J 11/00* (2006.01)
*C09D 11/54* (2014.01)

(52) U.S. Cl.
CPC .......... *B41J 11/0015* (2013.01); *B41M 5/0017* (2013.01); *C09D 11/00* (2013.01); *C09D 11/322* (2013.01); *C09D 11/328* (2013.01); *C09D 11/40* (2013.01); *C09D 11/54* (2013.01)

(56) References Cited

FOREIGN PATENT DOCUMENTS

| | | | |
|---|---|---|---|
| JP | 2003266659 A | 9/2003 | |
| JP | 2006-045294 A | 2/2006 | |
| JP | 2006341408 A | 12/2006 | |
| JP | 2007030946 A | 2/2007 | |
| JP | 2008132670 A | 6/2008 | |
| JP | 2009166262 A | 7/2009 | |
| JP | 2011020362 A | 2/2011 | |
| JP | 2012081707 A | 4/2012 | |

OTHER PUBLICATIONS

Communication dated Nov. 24, 2015, from the Japanese Patent Office in counterpart application No. 2012-235318, 8 pages in Japanese and English.
Communication dated Feb. 14, 2016, issued by the State Intellectual Property Office of the P.R.C. in corresponding Chinese Application No. 201380055874.0.
Communication dated Apr. 12, 2016, issued by the Japan Patent Office in corresponding Japanese Application No. 2012-235318.
Communication dated Apr. 21, 2016, issued by the European Patent Office in corresponding European Application No. 13848762.4.

\* cited by examiner

WHITE PARTICLE INK

DYE INK C

PRINTING METHOD USING WHITE PARTICLES

CROSS-REFERENCE TO RELATED APPLICATIONS

This application is a Continuation of PCT International Application No. PCT/JP2013/075018 filed on Sep. 17, 2013, which claims priority under 35 U.S.C. §119(a) to Japanese Patent Application No. 2012-235318 filed on Oct. 25, 2012. Each of the above application(s) is hereby expressly incorporated by reference, in its entirety, into the present application.

BACKGROUND OF THE INVENTION

The present invention relates to a printing method, particularly to a printing method of printing by an inkjet method on a colored printing medium.

For its simple structure and high-speed printing capability, the inkjet method is widely used, and trials are being made to print on not only paper but a variety of printing media including cloths, textiles, and smooth resin surfaces. Recently, printing is also tried on a colored printing medium having not been sufficiently decolored or a printing medium having been, for instance, deliberately colored, and desired color development is difficult to be achieved.

For instance, when ink is printed on a colored printing medium such as corrugated paper, the color of the printing medium interferes with the color of the ink and it is difficult to achieve the color development of the ink printed on a surface of the printing medium as it is. In particular, a brighter or higher saturation ink color tends to be more interfered with by the color of the printing medium.

To cope with it, pigment ink having light scattering ability is widely used for printing on a colored printing medium. The pigment ink printed on a surface of the printing medium scatters specified type of light and hides the color of the printing medium, which enables the color development of the ink to be achieved as it is without interference from the printing medium color. For example, organic pigment ink or inorganic pigment ink absorbs light at the pigment ink-specific wavelength while reflecting light at other wavelengths by the light scattering ability of particles, and can hamper the absorption of light at the printing medium-specific wavelength. In addition, by printing white particle ink composed of resin particles, inorganic pigments or the like and having high light scattering ability on the printing medium, white particles serve to color a surface of the printing medium white as well as hiding the color of the printing medium. Furthermore, when the white particles having light scattering ability are used in combination with ink having no light scattering ability, the combination works like pigment ink having hiding power.

In order to improve the light scattering ability of the pigment ink printed on the surface of the printing medium to hide the color of the printing medium, however, pigments contained in the ink need to have a large particle size to some extent. Accordingly, when such pigment ink is used in the inkjet method, this causes clogging of nozzles of a print head and therefore requires time-consuming maintenance on the print head.

As a technique to inhibit clogging of nozzles of a print head, a printing method in which white particle ink and an aggregating agent that aggregates the white particle ink are supplied to a colored printing medium is proposed by, for example, JP 2006-45294 A.

In the printing method described in JP 2006-45294 A, the white particle ink containing white particles with a small particle size is supplied to the printing medium by the inkjet method, thereby inhibiting clogging of nozzles of a print head with the white particles. In addition, the white particle ink supplied to the printing medium is aggregated by the aggregating agent and forms aggregates of the white particles so that the particle size is increased, whereby the print in white can be given on the surface of the printing medium with the color of the printing medium being hidden.

However, when pigment ink is used, a resin component serving as a binder needs to be added to the ink in order to fix pigments to a printing medium when the ink is dried up. As a result, when the ink is dried up, the resin is deposited at an unfavorable portion on a print head and therefore, the maintenance of the print head requires a certain level of labor in, for example, removing the deposited resin. Furthermore, pigment ink has a problem in that a color material is expensive. Meanwhile, dye ink in which a water soluble dye is dissolved in an aqueous medium is known as a type of ink which hardly allows clogging of nozzles of a print head to occur and whose color material is inexpensive. However, such dye ink has little light scattering ability and therefore, it has been difficult to achieve the color development of the dye ink as it is due to interference from the color of a printing medium P.

SUMMARY OF THE INVENTION

The present invention has been made to solve the foregoing problems in the conventional art and aims at providing a printing method for printing dye ink on a colored printing medium by the inkjet method, which is capable of achieving the color development of the dye ink as it is.

Solution to Problems

In order to attain the above object, the present invention provides a printing method of printing white particle ink containing white particles having light scattering ability on a colored printing medium by an inkjet method, comprising a step of supplying a first aggregating agent that induces an aggregation reaction of the white particles contained in the white particle ink, to the colored printing medium; a step of supplying, by the inkjet method, the white particle ink onto the colored printing medium having been supplied with the first aggregating agent such that aggregation of the white particles brings about increase in optical reflectance in a printing area; a step of supplying a second aggregating agent that is charged with same charge as that for the first aggregating agent and that induces an aggregation reaction of dye contained in dye ink, to the white particles aggregated; and a step of supplying, by the inkjet method, the dye ink to the white particles aggregated. The term "colored" in the present invention refers to having a certain color other than no color and white.

Preferably, owing to the aggregation reaction with the second aggregating agent, the dye contained in the dye ink is fixed at an upper portion and an inside of an agglomerate of the white particles aggregated whereby color development of the dye is improved.

Fine white particles with a particle size of about 1 μm or less have low light scattering ability and particularly, the light scattering ability thereof is low for light at a long wavelength. Accordingly, even when a printing medium is printed with the white particles, a sufficient white color does not appear, or due to the low scattering ability for light at a long wavelength, a bluish color appears. To overcome this problem, the white particles are aggregated by an aggregating agent after being deposited on the printing medium so that the white particles contribute to scattering light and the scattering intensity is increased, whereby the print in bluish color can be avoided. Specifically, the increase in optical reflectance in a printing area caused by aggregation can be detected by comparing the optical reflectance of the white particles having been just supplied onto a printing medium with the optical reflectance of the white particles having been aggregated. It is preferable to select an aggregating agent and aggregation conditions to allow the change as described above to occur compared to the case of printing with the white particle ink alone.

For example, in the case where the optical reflectance of a printing medium colored with yellow is 40% in a wavelength range of 600 nm, when the printing medium is printed solely with white particle ink containing resin particles having a particle size of about 0.5 μm, the reflectance is to be about 45% and the degree of improvement is small, whereas when the white particle ink undergoes an aggregation reaction with an aggregating agent supplied in advance, the reflectance can be 50% or more.

Meanwhile, when dye ink is printed after the white particle ink undergoes the aggregation reaction with the aggregating agent to form a white particle layer and the dye ink penetrates deep into the white particle layer, the color development of the dye ink is sometimes not sufficient in color strength due to the light scattering ability of the white particles positioned above the dye ink. To overcome this problem, the dye ink is caused to undergo an aggregation reaction with an aggregating agent at the white particle layer to thereby prevent the dye ink from penetrating deep into the white particle layer, whereby the color development of the dye ink can be achieved at sufficient color strength.

For instance, in the case where the reflectance of the printing medium colored with yellow is about 15% in a wavelength range of 450 nm in the example described above, the white particle ink and the aggregating agent are supplied to the printing medium to form the white particle layer, whereby a reflectance of 50% or more can be achieved in a wavelength range of 450 nm. In the case where yellow ink is further printed on the white particle layer, when the yellow ink does not experience an aggregation reaction with an aggregating agent, the yellow ink penetrates deep into the white particle layer and the reflectance exhibits a large value of about 35% in a wavelength range of 450 nm. In contrast, when the second aggregating agent is supplied and then the yellow ink is printed under the same conditions, the reflectance is to be 10% or less in a wavelength range of 450 nm and accordingly, the color development of the yellow ink can be achieved at sufficient color strength.

Hence, it is preferable to supply the second aggregating agent to prevent the dye ink from penetrating deep into the white particle layer and thereby achieve the color development in which the reflectance is 10% or less at the peak absorption wavelength of the dye ink printed on the printing medium.

Preferably, the dye ink is supplied to the colored printing medium before the white particle ink supplied onto the colored printing medium is dried up.

Preferably, the first aggregating agent and the second aggregating agent are same in type.

Preferably, the white particles are aggregated such that optical reflectance of the dye becomes higher by at least 10% than that of the colored printing medium.

There may be further provided an input section configured to input a target reproduction color used at the time of printing the printing medium, a supply amount calculator configured to calculate supply amounts of the white particle ink and the dye ink based on the target reproduction color input from the input section, and a controller configured to control a white ink supply device and a dye ink supply device based on the supply amounts of the white ink and the dye ink calculated by the supply amount calculator.

Preferably, the color development of the white particle ink, the color development of the dye ink and aggregation characteristics of these inks are stored in a database in advance, and in response to input of the optical reflectance of the printing medium and data of a target color required to be printed and achieved from the database, the supply amount calculator calculates the amounts of the white particle ink and the dye ink to be used in printing.

In order to decrease the printing amounts of the white particle ink and the dye ink as much as possible, it is preferable to use the function of the supply amount calculator to perform printing of the white particle ink only for a necessary area, i.e., an area where the color of the printing medium interferes with the color development of the dye ink, and not to perform printing of the white particle ink for an area where the white particle ink need not be printed according to the optical reflectance of the printing medium and a target color.

In addition, there may be further provided a measuring device configured to measure dye color development which is improved owing to an aggregation reaction with the second aggregating agent, and a correction amount calculator configured to calculate correction amounts of the supply amounts of the dye ink, the white particle ink, the first aggregating agent and the second aggregating agent based on light absorption characteristics of the dye and light scattering characteristics of the white particles as measured by the measuring device.

The colored printing medium may be constituted of corrugated paper.

Preferably, the white particles contained in the white particle ink has a particle size of up to about 1 μm.

Preferably, the first aggregating agent is supplied in an amount about two to ten times as much as an amount determined based on an index that is an isoelectric point of the white particle ink, and the second aggregating agent is supplied in an amount about two to ten times as much as an amount determined based on an index that is an isoelectric point of the dye ink.

The present invention provides a printing method of printing white particle ink containing white particles having light scattering ability on a colored printing medium by an inkjet method, comprising a step of supplying the white particle ink to the colored printing medium by the inkjet method; a step of supplying dye ink from above the white particle ink by the inkjet method; and a step of supplying an aggregating agent that induces an aggregation reaction of the white particles contained in the white particle ink and an aggregating reaction of dye contained in the dye ink such that aggregation of the white particles brings about increase in optical reflectance in a printing area and improvement in color development of the dye.

DETAILED DESCRIPTION OF THE INVENTION

The present invention will be described in detail below based on the preferred embodiments shown in the accompanying drawings.

Embodiment 1

Figure 1:
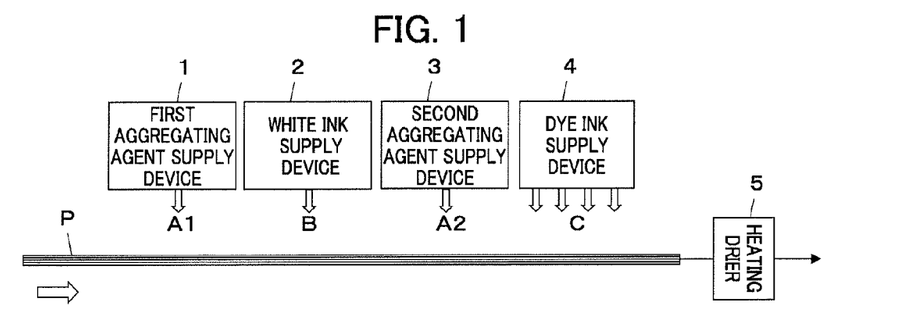
FIG. 1 is a block diagram showing the configuration of a printing apparatus according to Embodiment 1 of the invention.

FIG. 1 shows the configuration of a printing apparatus according to Embodiment 1 of the present invention. The printing apparatus serves to hide the color of a colored printing medium P with a white particle layer while coloring the white particle layer with dye ink, and includes a first aggregating agent supply device 1 supplying a first aggregating agent A1 used for aggregating white particle ink, a white ink supply device 2 supplying white particle ink B to the printing medium P by the inkjet method, a second aggregating agent supply device 3 supplying a second aggregating agent A2 used for aggregating dye ink, and an ink supply device 4 supplying dye ink C by the inkjet method.

The printing medium P is a printing medium colored with any color other than white. For instance, corrugated paper or the like may be used.

The first aggregating agent supply device 1 supplies the first aggregating agent A1 onto a surface of the printing medium P. The first aggregating agent A1 has a concentration adjusted to allow the white particle ink B supplied from the white ink supply device 2 to aggregate and form the white particle layer capable of improving the whiteness relative to the optical reflectance of the printing medium P, for instance, a concentration adjusted to allow the optical reflectance to be maintained at about 50% or more in a wavelength range of visible light.

The white ink supply device 2 is disposed downstream of the first aggregating agent supply device 1 in a moving direction of the printing medium P and jets droplets of the white particle ink B by the inkjet method onto the printing medium P having been supplied with the first aggregating agent A1.

The white particle ink B is ink in which white particles having light scattering ability are dispersed in an ink dispersion medium containing water as its main ingredient. The white particles for use have a particle size, i.e., a diameter, of up to about 1 μm, preferably up to about 0.5 μm, in order to inhibit clogging of nozzles of a print head. The particle size used herein refers to a primary average particle size. The particle size can be measured by any of known particle size measuring methods such as a photon correlation method and a laser diffraction method. The white particles dispersed in the white particle ink B undergo an aggregation reaction with the aggregating agent A1, and the aggregated white particles form the white particle layer having improved light scattering ability, thus improving the whiteness with respect to the optical reflectance of the printing medium P. The whiteness of the white particle layer can be adjusted by controlling a supply amount of the white particle ink B so as to hide the color of the printing medium P and maintain the optical reflectance at 50% or more.

For the white particles, use may be made of particles composed of inorganic compounds such as titanium oxide and zinc oxide, or macromolecular particles composed of acrylic material, polystyrene, vinyl chloride or polyethylene. When an inorganic compound is used for the white particles, the surface of the white particles may be treated with macromolecules in order to prevent the particles from settling out. When macromolecular particles are used for the white particles, they may be configured to be, for instance, hollow particles containing air therein to increase the interface between the particles and air so that the white particles can have improved light scattering ability. Furthermore, the specific gravity of the white particles may be decreased to prevent the white particles from settling out in the ink dispersion medium, thereby minimizing clogging of nozzles of a print head.

The second aggregating agent supply device 3 is disposed downstream of the white ink supply device 2 in the moving direction of the printing medium P and supplies the second aggregating agent A2 to the printing medium P having been supplied with the white particle ink B. The second aggregating agent A2 has a concentration adjusted to allow the dye ink C supplied from the dye ink supply device 4 to aggregate to thereby retain the dye at the white particle layer so that the color development of the dye is sufficiently achieved.

The dye ink supply device 4 is disposed downstream of the second aggregating agent supply device 3 in the moving direction of the printing medium P and supplies the dye ink C to the printing medium P having been supplied with the second aggregating agent A2. For the dye ink C, for example, ink obtained by dissolving water-soluble dye in water may be used. When supplied from above the white particle layer fixed on the surface of the printing medium P, the dye ink C undergoes an aggregation reaction with the second aggregating agent A2 whereby the dye contained in the dye ink C is fixed at the white particle layer as a result of aggregation, deposition, insolubilization, or the like, thus achieving the color development of the dye.

A heating dryer 5 is disposed downstream of the dye ink supply device 4 in the moving direction of the printing medium P and dries the printing medium P having been supplied with the dye ink C under heating.

Next, the aggregation reaction between the first aggregating agent A1 and the white particle ink B and that between the second aggregating agent A2 and the dye ink C will be described.

For the white particle ink B, an anionically charged white particle dispersion may be used. For example, use may be made of a white particle dispersion charged by an anionic surfactant or a charge control agent. Also for the dye ink C, an anionically charged dye aqueous solution may be used. Specifically, use may be made of acid dye having a functional group such as sulfonic acid ($-SO_3H$) or carboxylic acid ($-COOH$).

An aqueous polymer may be added to the white particle ink B and the dye ink C in order to adjust the viscosity and stabilize particle dispersion. In addition, a water-soluble high boiling point solvent such as ethylene glycol or glycerin may be added in order to prevent an inkjet head from being dried, an acrylic, polyester or urethane aqueous polymer dispersion may be added to the white particle ink B for the purpose of fixing the white particles onto the printing medium.

When the first aggregating agent A1 composed of a cationic polymer is used to induce an aggregation reaction of the white particle ink B having the white particles anionically charged by an anionic surfactant or the like and dispersed therein, an anion constituent of the white particle ink B reacts with a cation group of a cationic polymer contained in the first aggregating agent A1 and once the isoelectric point of the white particle ink B is exceeded, the aggregation occurs. Similarly, when the second aggregating agent A2 composed of a cationic polymer is used to induce an aggregation reaction of the dye ink C composed of a dye aqueous solution having an anionic functional group, a dye ingredient of the dye ink C reacts with a cation group of a cationic polymer contained in the second aggregating agent A2 and once the isoelectric point of the dye ink C is exceeded, the aggregation of the dye ingredient occurs. The aggregation of the dye ingredient described above includes deposition, insolubilization and the like of the dye ingredient.

Thus, the white particle ink B and the dye ink C are charged with the same charge, whereas the first aggregating agent A1 and the second aggregating agent A2 are charged with the opposite charge from the charge of these inks, whereby the aggregation reaction of each pair occurs. At this time, when the same type of aggregating agent is used for the first aggregating agent A1 and the second aggregating agent A2, the first aggregating agent supply device 1 and the second aggregating agent supply device 3 can have a common supply mechanism for example, that is, the control of the devices can be simplified.

The isoelectric points of the white particle ink B and the dye ink C at which the aggregation starts can be measured by providing an aggregating agent to each ink to be aggregated and observing the aggregation of a dispersed color material or the like. Accordingly, the measured isoelectric point can be used as an index for determining the amount of an aggregating agent with respect to each ink to be aggregated.

When the first aggregating agent A1 is actually supplied from the first aggregating agent supply device 1, it is preferable to supply the first aggregating agent in an amount about two to ten times as much as the amount determined based on the index that is the isoelectric point of the white particle ink B in consideration of deactivation of the aggregating agent and other factors. Similarly, when the second aggregating agent A2 is actually supplied from the second aggregating agent supply device 3, it is preferable to supply the second aggregating agent A2 in an amount about two to ten times as much as the amount determined based on the index that is the isoelectric point of the dye ink C.

For the first aggregating agent A1 and the second aggregating agent A2, the aggregating ability may be adjusted by selecting the type of functional group contributing to the aggregation or controlling the pH at which the aggregating agent works. For example, the degree of polymerization of a cationic polymer is increased to lower the moving speed in water whereby the rate of aggregation can be decreased even with a cationic group having the same density.

The anionic surfactant for use is a surfactant having a group that becomes an anion upon being dissociated in water, and examples thereof include carboxylic acid, sulfonic acid, and one having the structure of phosphoric acid. Specifically, fatty acid salt or cholate may be used for a carboxylic acid charge adjusting agent; linear alkylbenzene sulfonate, sodium lauryl sulfate, monoalkyl sulfate salt or alkyl polyoxyethylene sulfate salt may be used for a sulfonic acid charge adjusting agent; and monoalkyl phosphate salt or the like may be used for a charge adjusting agent having the structure of phosphoric acid.

The cationic polymer used for an aggregating agent may be an N,N-dimethylaminoethyl acrylate copolymer obtained by copolymerizing acrylamide and an N,N-dimethylaminoethyl methacrylate or N,N-dimethylaminoethyl acrylate monomer, a polyvinyl amidin polymer, or the like. The cationic aggregating agent for use may be, other than the cationic polymer, an inorganic aggregating agent such as polyferric sulfate, ferric chloride, polysilicate iron or polyaluminium chloride. Such an aggregating agent may be used in combination with the cationic polymer.

Next, a printing method performed by the printing apparatus will be described.

First, as shown in FIG. 1, the colored printing medium P is moved in a certain direction. The printing medium P is assumed to be constituted of colored corrugated paper.

When the printing medium P is moved and reaches the first aggregating agent supply device 1, the first aggregating agent supply device 1 supplies the first aggregating agent A1 onto the surface of the printing medium P. The first aggregating agent A1 for use is assumed to be a cationically charged aggregating agent.

Figure 2A:
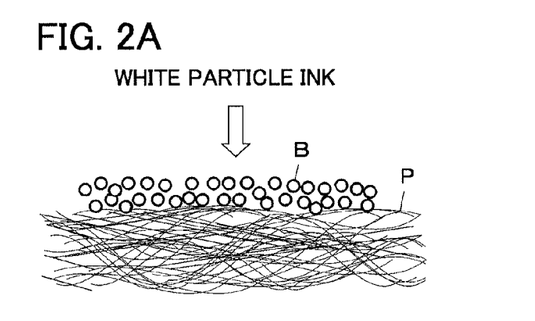
FIGS. 2A-2C are diagrams showing in steps the way the printing apparatus performs printing on a printing medium in Embodiment 1.

Subsequently, when the printing medium P having been supplied with the first aggregating agent A1 is moved from the first aggregating agent supply device 1 and reaches the white ink supply device 2, as shown in FIG. 2A, the white ink supply device 2 jets droplets of the white particle ink B onto the printing medium P by the inkjet method. At this time, the white particles contained in the white particle ink B are formed to have a particle size sufficiently small relative to nozzle holes formed at a print head of the white ink supply device 2, for example, a particle size of up to about 1 μm, so that the white particles are inhibited from clogging the nozzle holes.

Figure 2B:
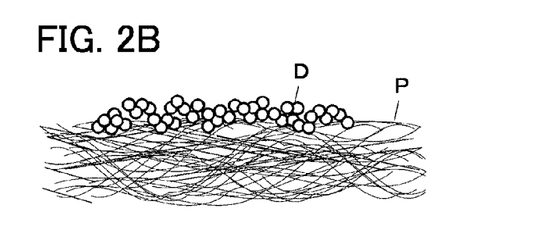

The white particle ink B having been supplied to the printing medium P undergoes an aggregation reaction with the first aggregating agent A1 present on the surface of the printing medium P and consequently, a white particle layer D in which the white particles are densely aggregated is formed as shown in FIG. 2B to thereby improve the whiteness relative to the color development of the printing medium P. The white particle ink B for use is, for instance, ink containing white particles charged by an anionic surfactant, an aqueous polymer for stabilizing the dispersion, glycerin as a high boiling point solvent, and the like.

Since light having a wavelength longer than the particle size of the white particles is not scattered very well and there is a large space between adjacent white particles in the state where the white particles are distributed on the surface of the printing medium P as shown in FIG. 2A, it is difficult to hide the color of the colored printing medium P. To deal with it, the white particle layer D in which the white particles are densely aggregated as a result of the aggregation reaction is formed to thereby hide the color of the printing medium P, as shown in FIG. 2B. Owing to this, the whiteness can be improved. The whiteness of the white particle layer D is adjusted by controlling the supply amount of the white particle ink B. The thus formed white particle layer D is fixed on the surface of the printing medium P by the aggregation reaction with a cationic polymer or by a resin ingredient having been added to the dye ink C in a separate process.

The aggregation reaction between the white particle ink B and the first aggregating agent A1 is preferably completed before the first aggregating agent A1 having been supplied to the printing medium P is dried up. This can be done by, for instance, printing the white particle ink B before the first aggregating agent A1 is dried up to allow the aggregation reaction to promptly occur; or adding a large amount of high boiling point solvent to inhibit the first aggregating agent A1 from being dried up, thereby carrying out the adjustment.

When the printing medium P having the white particle layer D thus fixed thereon is moved from the white ink supply device 2 and reaches the second aggregating agent supply device 3, the second aggregating agent supply device 3 supplies the second aggregating agent A2 to the printing medium P. The second aggregating agent A2 for use is an aggregating agent cationically charged as with the first aggregating agent A1 supplied from the first aggregating agent supply device 1 to the printing medium P.

When the first aggregating agent A1 and the second aggregating agent A2 for use are aggregating agents not only charged with the same charge but also of the same type, the first aggregating agent supply device 1 and the second aggregating agent supply device 3 can have a common supply mechanism for example, that is, the control of the devices can be simplified.

While the amount of unreacted aggregating agent is reduced due to the aggregation reaction between the first aggregating agent A1 and the white particle ink B, the second aggregating agent A2 is thus newly supplied so that the aggregating agent on the white particle layer D can be replenished.

Figure 2C:
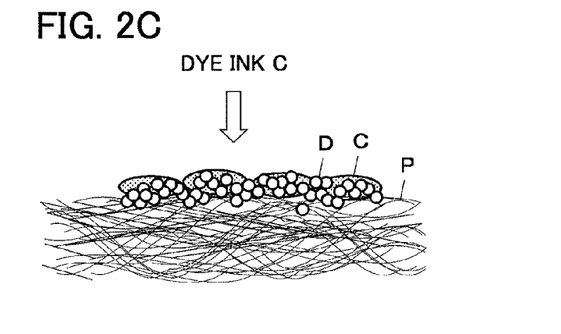

Subsequently, when the printing medium P having been supplied with the second aggregating agent A2 is moved from the second aggregating agent supply device 3 and reaches the dye ink supply device 4, as shown in FIG. 2C, the dye ink supply device 4 supplies the dye ink C by the inkjet method from above the white particle layer D formed on the surface of the printing medium P.

The dye ink C deposited on the white particle layer D promptly undergoes an aggregation reaction with the second aggregating agent A2 having been newly replenished to the white particle layer D and is thereby fixed in the inside of the white particle layer D without reaching deep inside the white particle layer D or the printing medium P under the white particle layer D. Since the dye ink C is thus fixed at the white particle layer D, the dye ink C is inhibited from moving to the bottom of the white particle layer D having light scattering ability so that the color development of the dye ink is not interfered with by the white particle layer D and therefore, the color development of the dye ink C can be achieved as it is.

Figure 3:
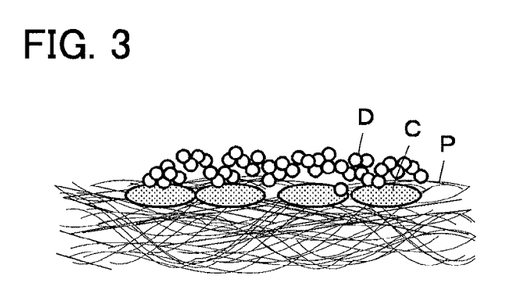
FIG. 3 is a diagram showing the state where dye ink is moved to a position under a white particle layer.

To be more specific, if the dye ink C reaches the bottom of the white particle layer D or the inside of the printing medium P as shown in FIG. 3, the light scattering ability of the white particle layer D impairs the color development of the dye ink C and therefore, the color development of the ink cannot be achieved. For example, if the second aggregating agent A2 is not supplied immediately before the dye ink C is supplied, because the amount of unreacted aggregating agent is reduced due to the aggregation reaction between the first aggregating agent A1 and the white particle ink B, the dye ink C deposited on the white particle layer D cannot experience a prompt aggregation reaction and therefore, moves to the bottom of the white particle layer D.

In the present embodiment, the second aggregating agent A2 is newly supplied immediately before the dye ink C is supplied and accordingly, the dye ink C can be fixed in the inside of the white particle layer D that serves to hide the color of the printing medium P.

Thus, the white particle layer D is formed on the surface of the printing medium P to hide the color of the printing medium P and in addition, the dye ink C is fixed in the inside of the white particle layer D, whereby the color development of the dye ink C can be achieved without being impaired by the light scattering ability of the white particle layer D. In other words, the light scattering ability of the white particle layer D which serves to hide the color of the printing medium P and the light absorbing ability of the dye ink C can both be attained and owing to this, the dye ink C can have an optical reflectance higher by at least 10% than that of the printing medium P. In particular, such colors as bright colors (blue, pink, yellow and the like) and high saturation colors (blue, red, orange and the like), which tend to be interfered with by the color of the printing medium P, can be reproduced with the use of the dye ink C having no light scattering ability.

The dye ink C supplied from above the white particle layer D is preferably supplied before the white particle layer D is dried up. When the dye ink C is supplied before the white particle layer D is dried up, this enables the dye ink C to stay at the upper portion of the white particle layer D until the aggregation reaction between the dye ink C and the second aggregating agent A2 is completed and therefore, a large portion of the dye ink C can be fixed at the upper portion of the white particle layer D.

The printing medium on which the dye ink C has been thus fixed at the white particle layer D is dried under heating by the heating dryer 5 to complete coloring of the printing medium P.

According to this embodiment, by fixing the dye ink C at the white particle layer D, the light scattering ability of the white particle layer D and the light absorbing ability of the dye ink C can both be attained and therefore, the color of the dye ink can be achieved as it is on the colored printing medium P. In addition, since printing is carried out with the dye ink C, this enables nozzles of a print head to be hardly clogged and printing costs to be reduced as compared to the case where pigment ink is used.

While in the embodiment described above, the second aggregating agent A2 for inducing the aggregation reaction of the dye ink C is newly replenished after the white particle layer D is formed on the surface of the printing medium P to thereby fix the dye ink C at the upper portion and the inside of the white particle layer D, the invention is not limited thereto as long as the aggregating agent is supplied so that the aggregation reaction of the dye ink C is completed at the upper portion and the inside of the white particle layer D.

Figure 4:
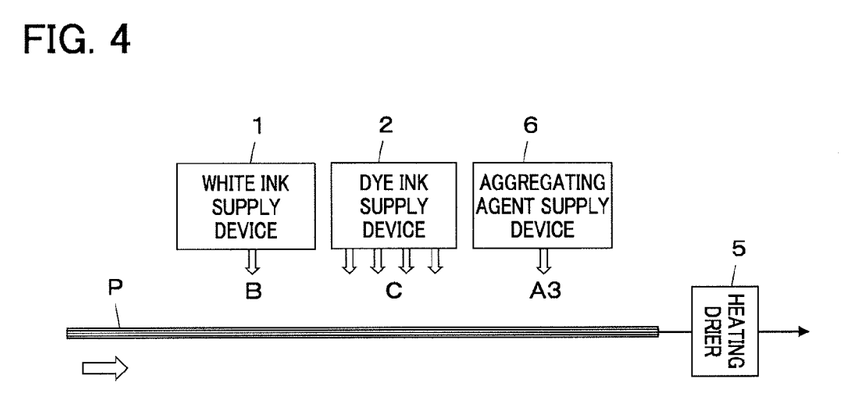
FIG. 4 is a block diagram showing the configuration of a printing apparatus according to a modification of Embodiment 1.

For instance, as shown in FIG. 4, an aggregating agent supply device 6 for supplying an aggregating agent A3 which is used to aggregate the white ink B and the dye ink C may be disposed downstream of a white ink supply device 1 and a dye ink supply device 2, as arranged in this order, in a moving direction of the printing medium P.

First, the white ink supply device 1 supplies the white particle ink B onto a surface of the printing medium P. Subsequently, the dye ink supply device 2 supplies the dye ink C by the inkjet method from above the white particle ink B having been supplied to the printing medium P. Then, the aggregating agent supply device 6 supplies the aggregating agent A3 immediately after the dye ink C is supplied. Consequently, the dye ink C promptly undergoes an aggregation reaction with the aggregating agent A3 and is fixed on the surface of the white particles, while the white particles undergo an aggregation reaction with the aggregating agent A3 and form the white particle layer D. As a result, the dye ink C can be fixed at the upper portion and the inside of the white particle layer D.

Thus, by supplying the aggregating agent A3 immediately after the dye ink C is supplied, the dye ink C can be fixed at the upper portion and the inside of the white particle layer D. In addition, since the aggregating agent A3 is used for the white particle ink B and the dye ink C in common, it suffices if only the aggregating agent supply device 6 is provided, and the control of the device can be simplified.

The dye ink C is preferably supplied before the white particles having been supplied onto the surface of the printing medium P are dried up. This enables a large portion of the dye ink C to be fixed at the upper portion of the white particle layer D.

Figure 5A:
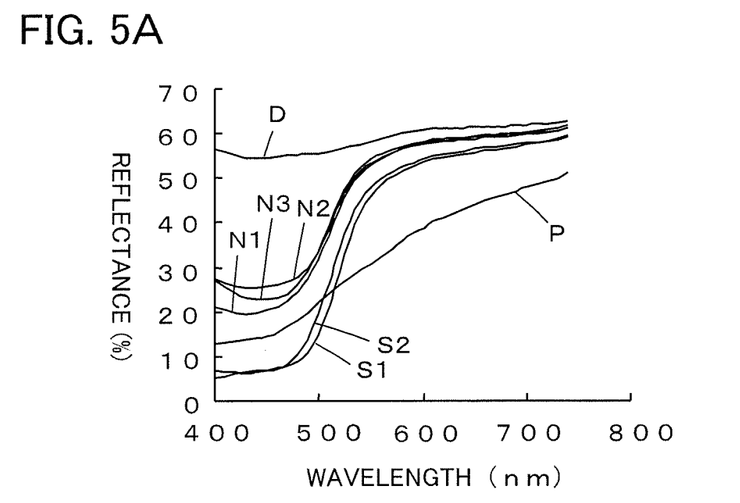
FIGS. 5A and 5B are graphs each showing measurement results of optical reflectance of a printed printing medium.
Figure 5B:
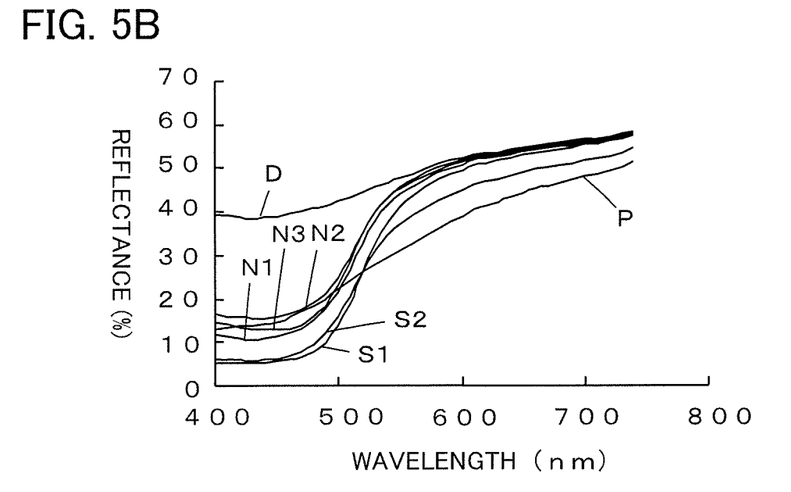

Next, an example in which the white particle ink B and the dye ink C were actually printed on a surface of each colored printing medium P is described. FIGS. 5A and 5B show measurement results of optical reflectance of printing media P having undergone printing under respective conditions. The optical reflectance was measured with a spectroreflectometer. Exemplary spectroreflectometers for use include one in which angles of incident light and measurement light have a relation of 0/45 degrees with respect to a measurement surface; and one having an integrating sphere and capable of measuring diffuse light.

FIG. 5A shows the results obtained when the white particle ink was printed at a printing amount corresponding to the supply of about 3 g/m² of white particles to the printing medium P and FIG. 5B shows the results obtained when the white particle ink was printed at a printing amount corresponding to the supply of about 2 g/m² of white particles to the printing medium P.

The measurement waveform P represents a measurement result of optical reflectance of the printing medium P and the measurement waveform D represents a measurement result of optical reflectance of the printing medium P on which the white particle layer has been formed by supplying an aggregating agent and then the white particle ink. The measurement waveform S1 represents a measurement result of optical reflectance of the printing medium P on which the white particle layer has been formed by supplying the aggregating agent and then the white particle ink and which has thereafter been supplied newly with an aggregating agent and then with yellow dye ink. The measurement waveform S2 represents a measurement result of optical reflectance of the printing medium P which has been printed with the yellow dye ink after printing with the white particle ink and immediately after that, supplied with the aggregating agent. The measurement waveform N1 represents a measurement result of optical reflectance of the printing medium P on which the white particle layer has been formed by supplying the aggregating agent and then the white particle ink and which has thereafter been supplied with the yellow dye ink before the white particle layer was dried up. The measurement waveform N2 represents a measurement result of optical reflectance of the printing medium P on which the white particle layer has been formed by supplying the aggregating agent and then the white particle ink and which has thereafter been supplied with the yellow dye ink after the white particle layer was dried up. The measurement waveform N3 represents a measurement result of optical reflectance of the printing medium P on which the white particle layer has been formed by supplying the aggregating agent and then the white particle ink, the white particle layer being thereafter supplied with a mixture of the yellow dye ink and the white particle ink.

The white particle ink used was ink in which hollow white particles made of resin and having a particle size of about 0.5 μm together with a surfactant, a high boiling point solvent (glycerin, ethylene glycol or the like), a dispersant and the like were dispersed in water. The dye ink used was ink obtained by adding a surfactant and a high boiling point solvent (glycerin, ethylene glycol or the like) to a water-soluble acid dye aqueous solution. The dye was yellow that absorbs light in a short wavelength range. The aggregating agent was supplied to the printing medium P in an amount of about 50 g/m². The printing medium P used was colored corrugated paper.

In FIGS. 5A and 5B, in the case of the measurement waveforms S1 and S2 obtained through printing under the same conditions as those in the embodiment described above, the reflectance observed is higher by at least 10% than that of the measurement wavelength P in a long wavelength range (550 nm to 750 nm) where the light absorption amount of the yellow dye is small. Furthermore, owing to the light absorption of the yellow dye, the reflectance is lower than that of the measurement wavelength P in a short wavelength range (400 nm to 550 nm) which is a light absorbing range of the yellow dye, and the reflectance exhibits a sufficiently low value of not more than 10%. While the corrugated paper constituting the printing medium P was murky yellow in color, the use of the white particle ink and the yellow dye ink as printed by the printing method of the invention brought about such characteristics that light in the short wavelength range was absorbed and light in the long wavelength range was sufficiently reflected. In other words, the reflectance is lower than that of the printing medium P in the short wavelength range where the yellow dye exhibits strong light absorption and therefore, strong color development is achieved. In contrast, the reflectance is higher than that of the printing medium P in the long wavelength range where the yellow dye exhibits weak light absorption. Thus, the yellow dye exhibited reflectance characteristics with high contrast according to the absorption wavelength, and the color development of yellow was achieved with high saturation. Furthermore, the color development of yellow of the dye ink was achieved as it is without interference from the color of the printing medium P.

On the other hand, in the case of the measurement waveforms N1 to N3 obtained through printing under the condition where the dye ink was not fixed at the white particle layer by the aggregating agent, the reflectance observed is higher than that of the printing medium P in the short wavelength range in FIG. 5A, and the reflectance observed is substantially the same as that of the printing medium P in the short wavelength range also in FIG. 5B. Thus, in the measurement waveforms N1 to N3, the optical reflectance in the short wavelength range does not sufficiently decrease, and it can be seen that the adequate color development of yellow of the dye ink did not achieved. Specifically, the color development of yellow is to be weak so that a whitish yellow color appears.

It is found from the results above that by fixing dye ink at the upper portion and the inside of the white particle layer D by the aggregating agent, the color development of the dye ink can be achieved as it is without interference from the color of the printing medium P. In addition, even when a bright color or a high saturation color is printed, the color development is not lowered and desired color development can be achieved.

Embodiment 2

Figure 6:
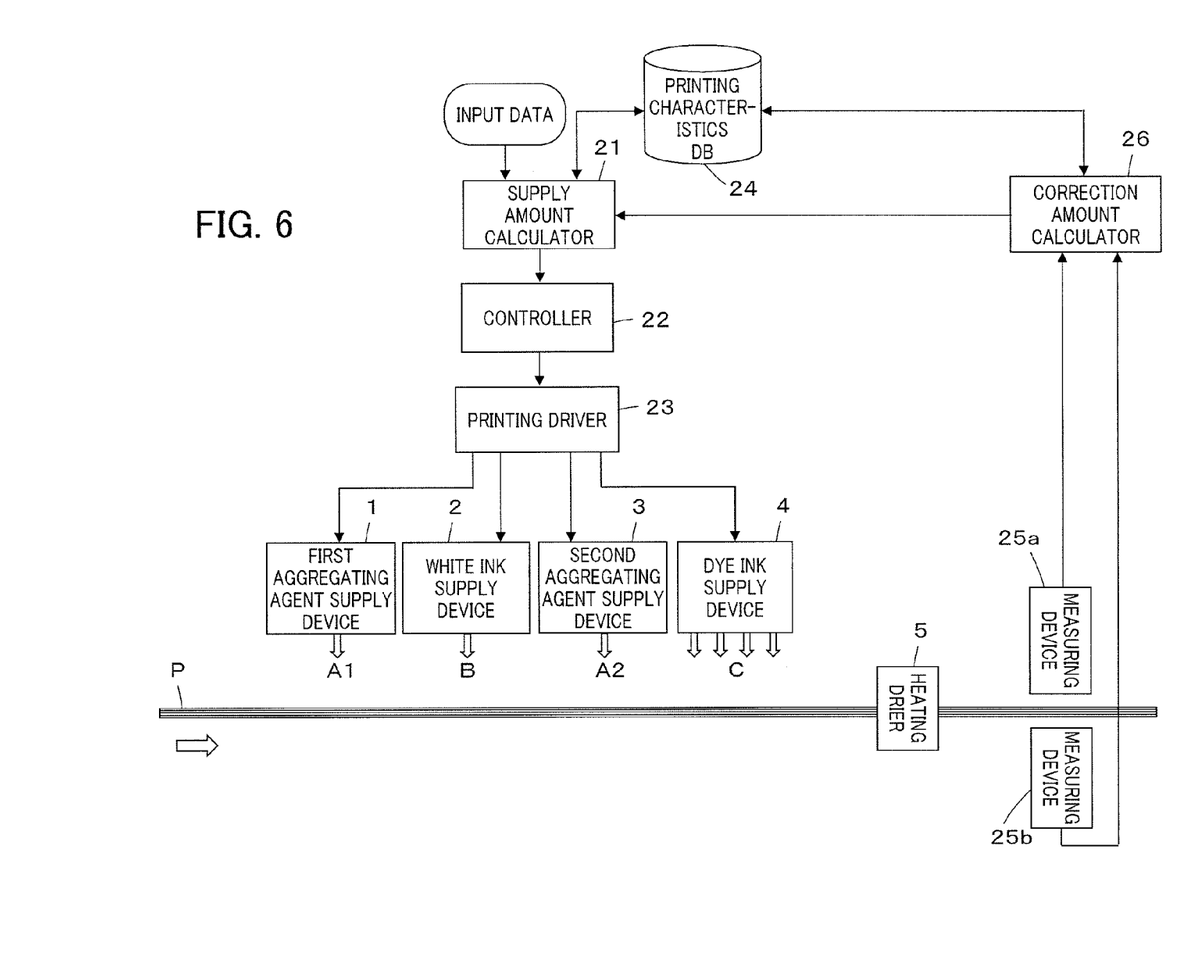
FIG. 6 is a block diagram showing the configuration of a printing apparatus according to Embodiment 2.

A printing apparatus according to Embodiment 2 is an apparatus which calculates supply amounts of the first aggregating agent A1, the white particle ink B, the second aggregating agent A2 and dye inks C based on input data so that the printing medium P is colored to achieve a target color (target reproduction color) and which measures printing results of the printing medium P to sequentially correct the supply amounts, as shown in FIG. 6.

The printing apparatus used in this embodiment includes a supply amount calculator 21, a controller 22 and a printing driver 23 that are sequentially connected, and the printing driver 23 is connected separately to the first aggregating agent supply device 1, the white ink supply device 2, the second aggregating agent supply device 3 and the dye ink supply device 4 of the printing apparatus used in Embodiment 1. The supply amount calculator 21 which determines supply amounts of the white particle ink and dye inks according to reflection characteristics of the target reproduction color and the printing medium P is connected to a printing characteristics database (DB) 24. The printing apparatus further includes measuring devices 25a and 25b that are disposed downstream of the heating drier 5 in the moving direction of the printing medium P so as to face the front and back sides of the printing medium, respectively, and that are connected to a correction amount calculator 26. The correction amount calculator 26 is connected to the printing characteristics DB 24. The correction amount calculator 26 is also connected to the supply amount calculator 21.

Light scattering characteristics of the white particle ink used in the printing system and absorption characteristics of the dye inks used in the same may be recorded in the printing characteristics DB 24 in advance. The light scattering characteristics of the white particle ink B can be obtained by printing the white particle ink B on the printing medium P as variously changing a printing amount of the ink and by referring to the change in optical reflectance. In addition, the light scattering characteristics of the white particle ink B can be obtained in advance using, for instance, the Kubelka-Munk equation expressed by $K/S=(1-Rc)2/2Rc$, where K denotes absorption intensity of a color material, S denotes light scattering intensity from a printing medium, and Rc denotes optical reflectance. The relation between the printing amount and the light scattering characteristics of the white particle ink may be quantitatively treated based on the Kubelka-Munk equation. Alternatively, the light scattering characteristics of the white particle ink B may be determined using a table showing the relation between the printing amount and the light scattering characteristics of the ink.

For the absorption characteristics of the dye inks C, color development characteristics can be obtained from the printing amounts of the respective dye inks C to be supplied to the printing medium P and the change in reflectance of the printing medium P after printing. When the absorption characteristics are obtained from K/S in the Kubelka-Munk equation, the relation between the printing amount and K/S is to be linear and therefore, the reflectance can be quantitatively determined. The absorption characteristics of the dye inks C supplied can be obtained by determining in advance the absorption characteristics of the white ink and the dye inks C as K/S values using the Kubelka-Munk equation above and in the case where the dye inks C are combined to carry out printing, obtaining the linear sum of the printing amounts of the respective dye inks.

The light reflection characteristics of the printing medium P after printing may be obtained by calculating a printing result for each wavelength and may be expressed as XYZ, a Lab value or the like, for example.

These characteristics are stored in the printing characteristics DB 24. Accordingly, the printing amounts of the white particle ink and dye inks of various colors necessary for achieving a target reproduction color can be determined.

These characteristics depend on the reflection characteristics of the first aggregating agent A1, the second aggregating agent A2 and the printing medium and therefore, are stored in the printing characteristics DB 24 according to the type thereof.

First, information on a type of the printing medium to be used and a target reproduction color is input to the supply amount calculator 21 from an input section which is not shown. Subsequently, the light reflection characteristics corresponding to the type of the printing medium P are referred to in the printing characteristics DB 24 and input to the supply amount calculator 21. The target reproduction color may be input using a color number to refer to light reflection characteristics data in the printing characteristics DB 24, or may be input as colorimetric data such as RGB or Lab to refer to the light reflection characteristics data in the printing characteristics DB 24. Still alternatively, the target reproduction color may be input as image data in which color data corresponding to printing positions on the printing medium P is described to refer to the light reflection characteristics data in the printing characteristics DB 24.

The supply amount calculator 21 sets the target reproduction color based on the input information and conducts search in the printing characteristics DB 24. The printing characteristics DB 24 has stored therein printing conditions used for achieving the color development of the target reproduction color on the printing medium P. The printing conditions are set in advance for the purpose of achieving the color development on the printing medium P. For instance, there are stored plural printing characteristics used in printing the printing medium P, such as the type of the white particle ink, the types of the dye inks, a supply amount of the white particle ink, supply amounts of the dye inks, a supply amount of the first aggregating agent and a supply amount of the second aggregating agent, in such a manner that plural kinds of printing characteristics correspond to respective target reproduction colors on the printing medium P.

The supply amount calculator 21 retrieves supply amounts of the first aggregating agent A1, the white particle ink B, the second aggregating agent A2 and the dye inks C from the printing characteristics DB 24 for achieving the target reproduction color on the printing medium P and inputs the retrieved information to the controller 22. The controller 22 outputs the supply amounts of the first aggregating agent A1, the white particle ink B, the second aggregating agent A2 and the dye inks C to the printing driver 23 at the appropriate timing, whereupon the printing driver 23 outputs driving signals corresponding to the relevant supply amount to the first aggregating agent supply device 1, the white ink supply device 2, the second aggregating agent supply device 3 and the dye ink supply device 4, respectively. In response thereto, the first aggregating agent A1, the white particle ink B, the second aggregating agent A2 and the dye inks C are sequentially supplied to the printing medium P. As a result, the white particle layer D is formed on the surface of the printing medium P and the dye inks C are fixed at the upper portion and the inside of the white particle layer D. Then, the heating drier 5 performs color development processing on the printing medium P to complete coloring of the printing medium P.

When the printing characteristics DB 24 does not store the printing conditions used for achieving the target reproduction color on the printing medium P, the supply amount calculator 21 calculates a printing amount from the light scattering characteristics and the light absorption characteristics of the white particle ink and the light scattering characteristics and the light absorption characteristics of the dye inks of various colors. The printing amount may be quantitatively calculated using the Kubelka-Munk equation, or the optimal printing amount may be calculated using a conversion table. The calculation results may be added to and stored in the printing characteristics DB 24 so that the printing amount need not be recalculated in the next printing operation.

In calculating the printing amount, it is preferable to select a combination of printing amounts of the inks so that the supply amount of the white particle ink is minimized. When the target reproduction color is darker than the color of the printing medium, the color can be reproduced without use of the white particle ink and only with the dye inks. Even when the white particle ink is necessary, the supply amount of the white particle ink varies depending on the target reproduction color and it is preferable to select a combination of prints so that the supply amount of the white particle ink is minimized. When the supply amount of the white particle ink is minimized, the total ink supply amount can be minimized, thereby enabling to reduce ink costs and lower drying load of the system.

Next, the optical reflectance of the printing medium P having undergone coloring is measured by the measuring devices 25a and 25b comprising optical sensors or the like, and the measurement values are input to the correction amount calculator 26.

Figure 7:
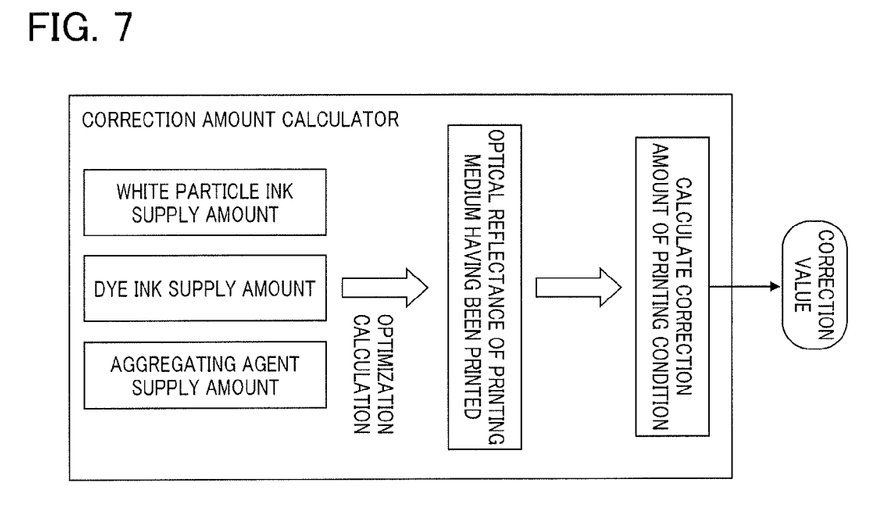
FIG. 7 is a diagram showing an example of a process of correcting printing conditions in a correction amount calculator.

The correction amount calculator 26 calculates correction amounts of the supply amounts of the dye inks and the like when the color development on the printing medium P having been printed based on the data in the printing characteristics DB 24 is different from the target reproduction color or when the color development on the printing medium P having been printed based on the data in the printing characteristics DB 24 is different from the target reproduction color, for example. The correction amount calculator 26 changes the light scattering characteristics of the white particle ink and the light absorption characteristics of the dye inks C so that the measurement values input from the measuring devices 25a and 25b approaches reproduction target values, and calculates correction amounts of the supply amounts of the first aggregating agent A1, the white particle ink B, the second aggregating agent A2 and the dye inks C based on the amounts of the change.

For instance, the correction amount calculator 26 may calculate correction values by referring to the printing characteristics DB 24 in which the light scattering characteristics of the white particle ink B and the light absorption characteristics of the dye inks C are stored in advance so as to correspond to the printing conditions (supply amount of the white particle ink B, supply amounts of the dye inks C, supply amount of the first aggregating agent A1 and supply amount of the second aggregating agent A2). The correction amount calculator 26 refers to the printing characteristics DB 24 and performs optimization calculation by variously changing the supply amount of the white particle ink B, the supply amounts of the dye inks C, the supply amount of the first aggregating agent A1 and the supply amount of the second aggregating agent A2 so that the measurement values obtained from the measurement devices 25a and 25b, i.e., the optical reflectance of the printing medium P having undergone printing, approach the reproduction target values. Accordingly, it is possible to calculate the correction values of the printing conditions so that the reproduction target values are achieved when the printing medium P is printed.

The correction amount calculator 26 outputs the calculated correction values of the printing conditions to the supply amount calculator 21, whereupon the supply amount calculator 21 corrects the printing conditions based on the correction values input from the correction amount calculator 26. Then, the first aggregating agent supply device 1, the white ink supply device 2, the second aggregating agent supply device 3 and the dye ink supply device 4 are driven according to the corrected printing conditions, and the printing medium P is again printed.

According to this embodiment, the printing conditions are corrected based on, in addition to the absorption characteristics of the dye inks, the light scattering characteristics of the white particle ink B and therefore, can be corrected with high accuracy.

It should be noted that the configuration of the printing apparatus according to this embodiment in terms of calculation of the printing amount among the printing conditions and calculation of the correction amount is applicable to the printing apparatus shown in FIG. 4. To be more specific, with regard to the supply amount calculator 21, the controller 22 and the printing driver 23 that are sequentially connected, the printing driver 23 is connected separately to the white ink supply device 1, the dye ink supply device 2 and the aggregating agent supply device 6 of the printing apparatus shown in FIG. 4. The measuring devices 25a and 25b are disposed downstream of the heating drier 5 in the moving direction of the printing medium P so as to face the front and back sides of the printing medium, respectively, and are connected to the correction amount calculator 26, which is in turn connected to the supply amount calculator 21. With this configuration, the printing conditions can be calculated and corrected based on the light absorption characteristics of the dye ink and the light scattering characteristics of the white particle ink B and therefore, can be corrected with high accuracy in the same manner as above. In addition, it is possible to select the printing conditions that enable minimization of the printing amount of the white ink.

What is claimed is:

1. A printing method of printing white particle ink containing white particles having light scattering ability on a colored printing medium by an inkjet method, comprising:
    a step of supplying a first aggregating agent that induces an aggregation reaction of the white particles contained in the white particle ink, to the colored printing medium;
    a step of supplying, by the inkjet method, the white particle ink onto the colored printing medium having been supplied with the first aggregating agent such that aggregation of the white particles brings about increase in optical reflectance in a printing area;
    a step of supplying a second aggregating agent that is charged with same charge as that for the first aggregating agent and that induces an aggregation reaction of dye contained in dye ink, to the white particles aggregated; and
    a step of supplying, by the inkjet method, the dye ink to the white particles aggregated.

2. The printing method according to claim 1, wherein owing to the aggregation reaction with the second aggregating agent, the dye contained in the dye ink is fixed at an upper portion and an inside of an agglomerate of the white particles aggregated whereby color development of the dye is improved.

3. The printing method according to claim 1, wherein the dye ink is supplied to the colored printing medium before the white particle ink supplied onto the colored printing medium is dried up.

4. The printing method according to claim 1, wherein the first aggregating agent and the second aggregating agent are same in type.

5. The printing method according to claim 1, wherein the white particles are aggregated such that optical reflectance of the dye becomes higher by at least 10% than that of the colored printing medium.

6. The printing method according to claim 1, wherein the colored printing medium is constituted of corrugated paper.

7. The printing method according to claim 1, wherein the white particles contained in the white particle ink has a particle size of up to about 1 μm.

8. The printing method according to claim 1, wherein the first aggregating agent is supplied in an amount about two to ten times as much as an amount determined based on an index that is an isoelectric point of the white particle ink, and the second aggregating agent is supplied in an amount about two to ten times as much as an amount determined based on an index that is an isoelectric point of the dye ink.

* * * * *